Feb. 4, 1969

J. FARMER 3,425,869

JUICE EXTRACTION PROCESS

Filed Nov. 4, 1964

Sheet _1_ of 4

FIG. 1

Inventor:
John Farmer
By Wilmer Mechlin
his Attorney

J. FARMER 3,425,869

JUICE EXTRACTION PROCESS

Filed Nov. 4, 1964

Inventor:
John Farmer
By Wilmer Mechlin
his Attorney

Feb. 4, 1969

J. FARMER 3,425,869

JUICE EXTRACTION PROCESS

Filed Nov. 4, 1964

Inventor:
John Farmer
By Wilmer Mechlin
his Attorney 3,425,869
JUICE EXTRACTION PROCESS
John Farmer, 3019 Hibiscus Drive,
Honolulu, Hawaii 96815
Filed Nov. 4, 1964, Sr. No. 409,002
U.S. Cl. 127—43   27 Claims
Int. Cl. C13d 1/02

ABSTRACT OF THE DISCLOSURE

A process for extracting juice from cellular material in one or more stages following disintegration, in each of which the material is cross-rinsed with diluent liquid to separate juice therefrom, and thereafter has excess liquid removed, the material in at least one stage being soaked prior to cross-rinsing for releasing juice therefrom.

---

This invention relates generally to the extraction of juice from sugar cane and other cellular material, and more particularly to a process for extracting such juice and a machine for use therein.

The extraction of juice from cellular material presents two problems, one to release the juice from the cells in which it is contained and the other to separate the released juice from the material. Most such materials are comparatively homogeneous in their cell structure and hold their juice in thin-walled cells. They thus lend themselves to mechanical extraction by pressure sufficient to rupture their cells and express the juice from the pulp. While sugar beets fall in this category, their juice is now almost univarsally extracted by a diffusion process, because the sucrose it extracts is practically uncontaminated by the impurities also contained in the cells. In this process the beets, after being sliced thinly into cossettes, are subjected to a counterflow of water. Although termed by the beet industry "diffusion," the process might more accurately be termed "dialysis" since its extraction largely involves the release of juice through the walls of unbroken cells. The juice extracted is almost of the initial pol in the cells and the extraction is very close to complete.

Sugar cane, the main source of sucrose, is very different from sugar beets and unique among materials processed for juice in its structure and properties. Its structure is heterogeneous and only some 85% of the juice is loosely held in the large, thin-walled storage cells surrounding the many fibro-vascular bundles of longitudinal fibers and connecting pith within the stalk. The remaining 15% is tightly held in the bundles, in smaller thicker-walled cells near the rind and in the tough tissues of the rind and nodes. The stalk is composed by weight of about 88% juice and 12% fiber and contains numerous air pockets or voids. Not only is a substantial part of its juice tightly held, but sugar cane, when reduced to bagasse, is resilient and its fibers and pith have such a sponge-like affinity for liquid that they can absorb up to ten times their weight of water or dilute juice.

With such structure and properties, sugar cane is understandably reluctant in releasing juice from its cells. Most of the large storage and other cells can be ruptured mechanically, but a substantial portion of the juice they contained will still be tightly held in part in pockets in broken cells protected by tiny air bubbles and in balance adhering to the fibers. Both release and separation of the juice, therefore, are difficult. Even so, upwards of 90% of the juice can be extracted by pressure and in milling, the process commonly used an average of 93% and a maximum of 95% is obtained by mill trains. In such trains, the cane, reduced to bagasse by the initial crushing, is passed rapidly through a succession of mills in which it is subjected to enormous pressures of from 10,000–15,000 p.s.i. and between which imbibition water or dilute juice is added to the residual juice to provide a sufficient liquid bulk for expression by succeeding mills.

Consonant with the pressures its mills must exert, a mill train represents a very large initial investment and its maintenance costs and power requirements are very high. Although it does extract most of the juice in the 45 seconds or so in which the bagasse is in process, the juice extracted is progressively more dilute and contains an increasing percentage of impurities as the end of the line is approached. Too, the interval in which the imbibition water or dilute juice is applied to a conventional mill train, is so short and the affinity of the bagasse for liquid so high that the diluent liquid does little more than penetrate the surface of the bagasse blanket and mixes only superficially with the residual juice. This step of adding liquid diluent between mills, although sometimes so termed, is ill-defined as "maceration," since there is neither the time nor the mixing needed to reduce the bagasse to a soft mass by soaking. Much less can the step produce diffusion. A conventional mill train, therefore, must depend entirely upon rupturing of cells to release juice and in this its efficiency for a high extraction is low.

Diffusion, practiced so successfully on sugar beets, has now been adapted to sugar cane, but in the adaptation has become essentially washing rather than dialysis and dependent primarily upon rupturing of cells by a preliminary disintegration to release the juice. As now practiced upon sugar cane, diffusion involves the conveying of a blanket of disintegrated bagasse through a tank against a counterflow of water introduced at the opposite end, with the diluent liquid usually recirculated through succeeding sections of the blanket for flow therethrough by gravity and becoming progressively richer in sucrose as it approaches its point of discharge. In another form, the countercurrent flow of liquid through bagasse is continuous with the bagasse progressed through the tank by oppositely turning intermeshing screws having perforated blades. In both the usual and this other form of the process, the tank is long and the rates of counter-movement of the bagasse blanket slow, so as to give a retention time of some 40–60 minutes. This does afford time for dialysis to occur, with the result that the process is capable of extracting upwards of 97% of the sucrose, even though the preliminary disintegration at best only ruptures the cells in which some 94% was contained. While slow and requiring a large floor space, the juice it extracts is of high purity, as well as of high concentration in sucrose.

To increase the extraction by milling, there have been some mill trains in which the brief inhibition of conventional milling is extended in time and in the quantity of the diluent liquid added at least in advance of the last mill. In such installations the blanket of bagasse from a preceding mill is conveyed through a tank or bath in which it is immersed in dilute juice, with the retention time of about two minutes and large excess of diluent liquid such that the step is properly defined as "maceration." These modified mill trains can extract as much as 96% of the sucrose, but still depend for the extraction primarily upon the pressures exerted by the mills. And, as in diffusion, the bagasse discharged from the liquid treatment is very difficult to handle.

The primary object of the present invention is to provide an improved process for extracting juice from sugar cane and other cellular materials, which, as applied to sugar cane, can extract more high purity juice is less time and space than diffusion and entails far less initial and operating expenses than milling.

Another object of the invention is to provide an improved process for exracting juice from cellular material, which is so versatile that it can employ many physical and chemical effects for releasing and separating the juice from the material.

A further object of the invention is to provide a process for extracting juice from cellular material, whereby by disintegrating the material and then subjecting it to a plurality of processing stages in each of which the material is first soaked and rinsed with diluent liquid, and then has the excess liquid removed, a high extraction is obtained.

An additional object of the invention is to provide a process for extracting juice from cellular material, wherein the material is subjected to a plurality of stages of alternate soaking-rinsing with and removal of excess diluent liquid, and before each stage is partly disintegrated, thereby enabling the disintegration to be finer and the extraction higher than feasible with a single preliminary disintegration.

Another object of the invention is to provide a process for extracting juice from cellular material, wherein the material not only is disintegrated and subjected to a plurality of stages of soaking-rinsing and excess liquid removal, with the diluent liquid overall flowing counter the movement of the material, but the final stage liquid is filtered through a section of the material for removing solid impurities.

Another object of the invention is to provide a process for extracting juice from cellular material, wherein the material is disintegrated and subjected to a counter-moving diluent liquid in a plurality of stages of alternate soaking-rinsing with and removal of excess liquid and throughout is subjected at most to light pressure except in a final stage in which its liquid content is so reduced as to facilitate handling of the discharged material for by-product or other use.

A further object of the invention is to provide a process for extracting juice from cellular material, wherein the material after being disintegrated is moved downwardly by gravity at a controlled rate through a container and therein subjected to injections of diluent liquid at a plurality of levels, with the retention time such as not only to soak the material and rinse out juice but to permit releasing by diffusion of at least some of the juice contained in unruptured cells.

An additional object of the invention is to provide an improved machine for use in a process for extracting juice from cellular material, whereby material from a processing stage can be shredded and scrubbed to further disintegrate the material and release tightly held juice.

Other objects and advantages of the invention will appear hereafter in the detailed description, be particularly pointed out in the appended claims and be illustrated in the accompanying drawings, in which:

Referring now in detail to the drawings in which like reference characters designate like parts, the improved process and machine for use therein of the present invention, are usable in extracting juice from any cellular material, but probably will find their main use on sugar cane. Since the unique structure and physical properties of sugar cane make it probably the most difficult of cellular materials from which to extract juice, a description of the application of the improved process and machine to sugar cane will suffice for an understanding of their application to other cellular juice containing materials. It, therefore, is to sugar cane that the description will be particularly directed as exemplary of the invention.

Basically, the improved process involves an initial disintegration of sugar cane into bagasse to rupture juice-containing cells, followed by an overall counter-movement of the disintegrated bagasse and a diluent liquid, during which the bagasse is subjected to a plurality of stages of processing in each of which it is first soaked and rinsed with the liquid to release and separate from it some of the juice or sucrose and then has the excess liquid from the first step removed by pressure or gravity draining to ready it for release and separation of residual juice by more dilute liquid diluent in the succeeding stage. In its most effective form the process also makes use of other effects, both physical and chemical, for releasing and separating the juice or sucrose from the fiber. But even in the basic form, several effects are employed. In the first step, a physical effect, mechanical rupturing of juice-containing cells is availed of to release juice and some of this juice will separate from the bagasse during the disintegration. In each of the plurality of stages, there will be at minimum, as releasing effects, maceration or soaking by the applied diluent liquid to soften the fibers, mixing of the residual juice with the diluent liquid and diffusion, all of which are to a degree dependent upon temperature and time and, except for maceration, are affected by the concentration gradient between the residual juice and the diluent liquid. The minimum separation effects in each stage are rinsing by the diluent liquid and the later pressure or gravity removal of the excess liquid.

The fundamental difference between the process of this invention and diffusion in extracting juice from sugar cane is that, except for an initial disintegration and a final pressing, diffusion is a single stage process in which the disintegrated bagasse is continuously subjected to a counter-flow of diluent liquid, while, with the same exceptions, this process is performed in a plurality of stages in each of which the disintegrated bagasse is first subjected to a diluent liquid and the excess liquid is then removed. Not only can the present process extract more juice in less time, but its performance in stages permits the use in and between stages of physical and chemical effects that are barred to diffusion. Milling is similar to the present process in being conducted in stages, although in its stages the cane or bagasse is subjected first to pressure and then to a diluent liquid. But in any form in which it is now practised, milling differs fundamentally from both the present process and diffusion in depending wholly on pressure to separate the juice from the bagasse and either wholly or at least mainly on pressure also to release the juice.

In keeping with its versatility, the process in its preferred form, can increase the extraction of juice from sugar cane to about 98% by adding further physical and chemical effects to the basic process, both within and between the stages. Among the possible additional effects within the stages are turbulence and agitation, the Dupre effect and cavitation for better mixing of the diluent liquid with residual juice from ruptured cells and heat or releasing juice from unruptured cells. Possible additions between the stages are further mechanical disintegration to rupture more cells and mechanical scrubbing to provide energy for freeing residual juice tightly adhering to the fibers and barricaded by tiny air bubbles in pockets in ruptured cells. Of these effects, turbulence and agitation for releasing bound juice by the expenditure of energy, can be obtained by injecting the diluent liquid under pressure, most satisfactorily into a column of bagasse below its top, with the incidental benefit that the consequent swift flow of the liquid past the fiber will mitigate against channeling and generate a shear force that acts to loosen tightly adhering juice. The Dupre effect, produceable by introducing large air bubbles into the bagasse with the diluent liquid, causes surging and turbulence, which not only inhibits channeling by dislodging and constantly changing the flow pattern of the liquid, but, by the surface tension of the liquid surrounding the bubbles, creates surfaces which release tightly held juice by exerting a wiping action as the bubbles move past the fibers. Cavitation, the effect of sound in liquid, can be generated by ultrasonic vibration, sonic vibration or mechanical vibration of large amplitude and is a very effective means of removing tiny air bubbles interferring with mixing by trapping residual juice in cavities in the bagasse.

The last of the above within-stage effects, heat, is readily produced by introducing the diluent liquid hot into the bagasse and has the salutary effect, when the temperature of the bagasse is raised to from 175°–185° F., of both softening the fibers and killing the walls of living or unruptured cells, such that the residual juice and diluent liquid can transmigrate freely therethrough. The mentioned additional between-stage effects, further disintegration and scrubbing, both are mechanically produceable and have the effect of rupturing previously unruptured cells and supplying energy for dislodging juice from ruptured cells that, nonetheless, is tightly held by its adherence to the fibers.

Figure 1:
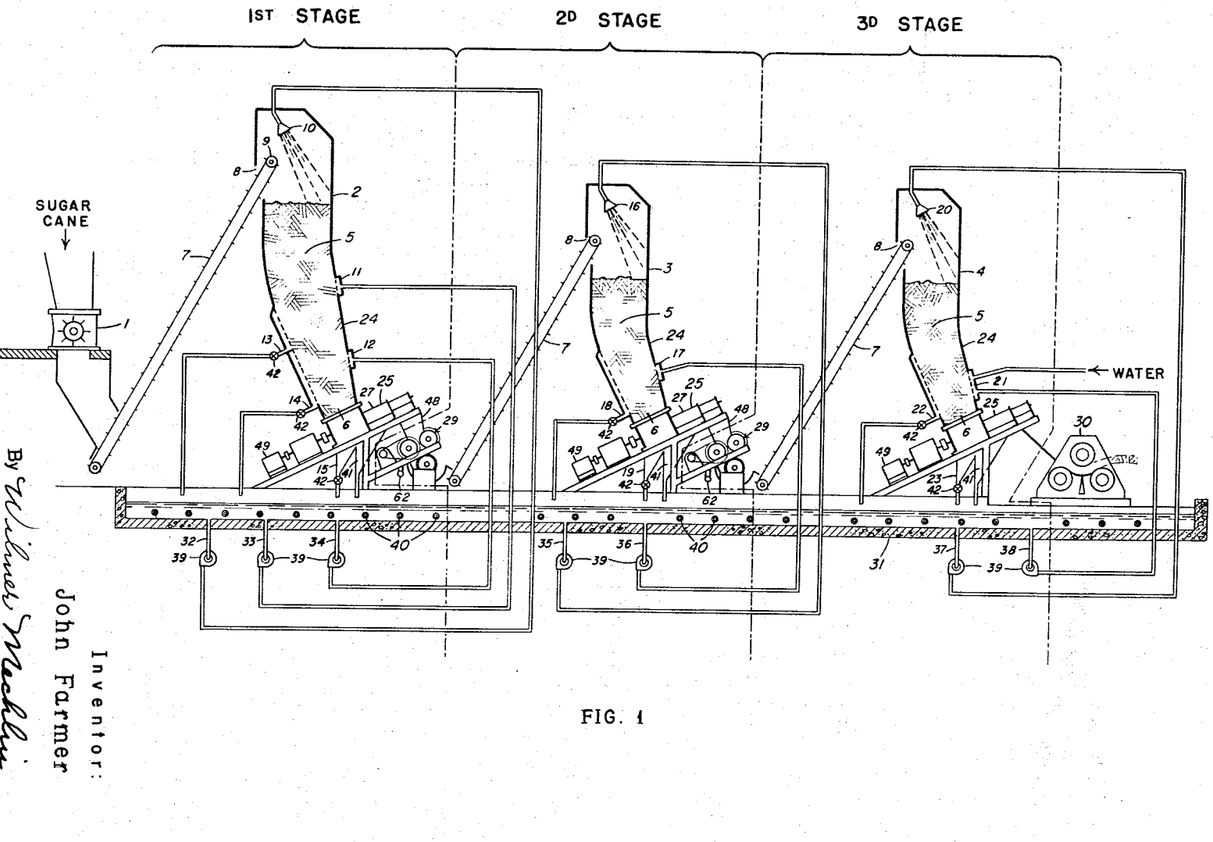
FIGURE 1 is a somewhat schematic view of a processing line for carrying out a preferred form of the process of the present invention.

Appropriately termable, as a whole, a washing process the process of this invention is illustrated in FIGURE 1 showing somewhat schematically a processing line for a preferred form of the process which is capable of extracting some 98% of the juice from sugar cane. As in the basic process, the cane in the illustrated process is first disintegrated or prepared to rupture juice-containing cells and the disintegrated cane or bagasse is then processed or treated in a plurality of stages in each of which it is soaked and rinsed with diluent liquid and thereafter has the excess liquid removed before being progressed to the succeeding stage. Moving from the front to the rear through the line, the bagasse, after the initial disintegration, is subjected at intervals and in each stage to a diluent liquid made up in part of water and, overall, moving or flowing countercurrent the bagasse.

The illustrated process adds to the basic process several processing effects for increasing the extraction, including partial disintegrations between the stages. It therefore is not necessary that the initial disintegration be as fine or thorough as otherwise would be required for a maximum extraction. Even so, it is desirable that the initial disintegration be such as to rupture the cells containing at least about 90% of the juice and this is accomplishable variously by suitable means, including, although comparatively expensively and with disadvantage to the soaking-rinsing in at least the first stage, crushing of the cane in a conventional sugar mill. In the illustrated process, it is accomplished by first cutting or chopping the cane into short lengths by a prebreaker or chopper (not shown) and then shredding the chopped cane in a Searby, Maxwell or other suitable shredder 1 in which the cane is either shredded as in a Searby or both crushed and shredded as in a Maxwell.

In the illustrated process there are three stages of soaking and rinsing with and removal of excess diluent liquid. In each of these stages, the soaking and rinsing preferably are conducted in a downwardly directed container or hopper, such as described in detail in my copending application Ser. No. 408,944 filed concurrently herewith. Arranged in tandem, the hoppers, numbered, respectively, 2, 3 and 4 for the first, second and third stages, are each filled to a predetermined level with a column 5 of bagasse which, as the bagasse moves downwardly by gravity toward a discharge opening or outlet 6 in the bottom of the hopper, is continuously replenished at the top and depleted at the bottom at related controlled or regulated rates.

As in the above application, each of the hoppers 2, 3 and 4, conveniently is fed by a cleated belt endless or other suitable elevator or conveyor 7, which introduces the bagasse from the initial disintegration or preceding stage into the upper part of the hopper through an inlet opening 8 and the first of which preferably has at its upper end a magnetic pulley 9 for removing any tramp iron that was mixed with the cane. Within each hopper the bagasse is injected with diluent liquid in a plurality of stages at different levels, in the first stage by spraying, applying or injecting the liquid from above onto the bagasse as it enters and into the top of the column 5 and the second and any further stages by injecting liquid into the side of the column 5 below its top. Each injector or liquid inlet has its own individual liquid outlet at a lower level and so relatively disposed as to receive most of the flow of liquid generated by that injection after the liquid has passed through a part of the column 5. While, in the illustrated process, all of the hoppers are fitted for a first stage injection into the top of the column and have an outlet for each stage, the first hopper 2 preferably is considerably higher than the others to provide a longer retention time and, correspondingly, only it is fitted for injecting liquid at more than one lower level, it providing two such lower injections. For differentiation, the top, intermediate and lower injectors of the first hopper 2 have been designated as 10, 11 and 12 and the related liquid outlets as 13, 14 and 15, the top and lower injectors for the second hopper 3 as 16 and 17 and related outlets as 18 and 19, and the top and lower injectors of the third hopper 4 as 20 and 21, and the related outlets as 22 and 23. Of the injectors, the top injector 10, 16 or 20 supplies, in each hopper 2, 3 or 4, the liquid by which the entering bagasse is soaked and consolidated, while that and the lower injector or injectors 11 and 12, 17 or 21 supply rinsing liquid for rinsing out residual juice.

Progressively compressed as it approaches the outlet or bottom opening 6 in its hopper 2, 3 or 4 by the overlying weight of bagasse and liquid in the column 5 and with the lower part 24 of each hopper inclined and also tapering toward the bottom, the former to aid in directing the flow of liquid in each stage to its outlet and the latter for deriving horizontal as well as vertical compression from the overlying weight of the column, the bagasse might be controlled in its rate of movement through the hopper by regulating or predetermining the area of the discharge opening 6. However, as in the above application, it is preferred for more positive control that the bagasse be positively withdrawn from the bottom of the column. Such positive withdrawal is obtainable in numerous suitable ways, as by connecting to the bottom of each hopper a rotary rake, as disclosed in my copending application Ser. No. 341,659, filed Jan. 31, 1964, now Patent No. 3,279,357, a rotary vane or vane press, a rotary rake being preferred where gravity drainage is relied upon to remove the excess liquid in the second step of the stage. The illustrated process relies, rather, on removing the excess liquid by pressure and, as an alternate to the rotary press of application Ser. No. 341,659, has connected to the bottom of each hopper a multiple screw press 25, such as shown and described in detail in concurrently filed application. For purposes of the present description, it suffices that each of the illustrated screw presses 25 receives the bagasse discharged through the discharge opening 6 of its hopper and, by removing the bagasse at a controlled rate, controls or regulates the rate of downward movement of the bagasse in the column 5 within the hopper. As it is removed, the discharged bagasse is driven by the screws 26 through the barrels 27 and extruded therefrom through restricted orifice 28, with the sizes of the orifices preferably regulated automatically in the manner described in my concurrently filed application, so that the pressure applied in all the barrels will be the same. With its excess liquid so removed, the bagasse extruded by the screw presses 25 of the first and second hoppers 2 and 3 is discharged into a teasing and scrubbing machine 29, hereinafter to be described in detail, by which it is further disintegrated and scrubbed mechanically, the former to rupture further cells and the latter to release tightly held residual juice.

After passing through the teasing and scrubbing machine 29, the bagasse from each of the first and second stages is fed to the next stage by the latter's elevator 7. By contrast, the bagasse extruded from the screw press 25 of the third hopper 4, the juice in which is quite dilute and contains only a very small percent of the initial juice, is compressed by suitable means, such as the illustrated three roll mill 30, to extract a further modicum of the initial juice and reduce the liquid content of the bagasse exhausted from the process to a level at which it is readily manageable for byproduct or other use.

Rather than discharge the juice removed at various points in the process into separate reservoirs or receptacles, the illustrated line makes use of a single continuous reservoir, trough or sump 31, extending longitudinally of the line below the various devices through which the bagasse moves and sloping gradually toward the front, both for receiving all of the discharged juice and, except for make-up water, for supplying the diluent liquid introduced in the various stages.

The purpose of the counter-movement of the bagasse and diluent liquid is progressively to increase the juice concentration or richness of the liquid as it approaches the front of the line, while correspondingly decreasing the rich juice content of the bagasse as the latter approaches the rear of the line. This purpose is served with the mixing and diffusion between the diluent liquid and the residual juice upon which this process is primarily dependent for high extraction and without continuously exposing the bagasse to the diluent liquid, as in the diffusion process, by discharging or draining the juice from the hopper outlets 6 into the reservoir 31 at spaced positions or points, in the order from the front of their positions in the line, and tapping the reservoir 31 for the diluent liquid for each injection to the rear of the discharge position of the related outlet, the latter to provide the concentration gradient of the residual juice over the injected juice necessary for extraction by the injection. The taps 32, 33, 34, 35, 36, 37 and 38, respectively, for the injectors 10, 11, 12, 16, 17, 20 and 21 are spaced longitudinally of the reservoir 31 and in the same order from the front of the line as their injectors. With this arrangement and a flow gradient toward the front, due mainly to the addition of liquid at the rear, such as to provide a flow at a steady rate in that direction, while maintaining the level of the liquid in the reservoir substantially constant, the reservoir is enabled to serve as a common receptacle for all the juice extracted along the line and as a common source of varying richness for all of the dilute juice applied as diluent liquid.

All of the make-up water required for the process may be added near the end of the line, conveniently as diluent liquid for the last rinsing stage, in which case it would be introduced, either alone or with dilute juice, through the lower or second injector 21 of the third hopper 4. However, if, as in the illustrated process, the bagasse is further disintegrated in advance of the second and third stages and the means employed for the purpose is the teasing and scrubbing machine 29, in which, as later will be explained, superheated water is used for jet scrubbing, the water so added will be part of the make-up water and the amount added near the end of the last rinsing stage will be reduced accordingly.

The processing effects employed in the preferred form of the process, in addition to the intermediate partial disintegrations, are pressure rinsing and heat. The pressure rinsing is obtained by injecting or pumping diluent liquid under positive or superatmospheric pressure into the columns 5 of bagasse in the several hoppers 2, 3 and 4 through the lower level injectors 11, 12, 17 and 21, with the pressure, in the cases in which the liquid is diluent juice, conveniently supplied by the related of the circulating pumps 39 by which the juice from the reservoir 31 is pumped to the various injectors. The heat for heating the bagasse to the desired temperature range of from 175°–185° F., within which the walls of living or unruptured cells are killed and the residual juice therein and the diluent liquid can transmigrate freely therethrough, is readily obtained by heating the juice in the reservoir 31 to the required temperature, as by steam or other suitable heating coils 40 appropriately positioned in the reservoir.

If desired, the rinsing action obtained in the hoppers can be supplemented, in the manner described in my concurrently filed application, by injecting liquid diluent into the barrels 27 of the screw presses 26 in advance of the orifices 28 for flow counter the bagasse to the liquid outlets 41 from the barrels 27, through which the juice expressed by the pressure exerted in the barrels is discharged. The further effects previously mentioned, the Dupre effect and cavitation, will not ordinarily be needed, but, if desired, can readily be obtained; the Dupre effect, by introducing slugs of air with the diluent liquid injected into the bagasse columns 5 through one or more of the lower level injectors 11, 12, 17 and 21, and cavitation by mounting suitable means on one or more of the hoppers 2, 3 and 4 for applying the necessary vibration to the bagasse column or columns contained therein.

The preferred hoppers 2, 3 and 4 in which the soaking and rinsing is conducted increase the efficiency of the preferred pressure rinsing by injecting the liquid below the tops of the columns 5, at a point at which the bagasse is compressed by the weight of the column thereabove, with the compression not only vertical, but, by virtue of the tapered or wedge shape of the lower parts 24 of the hoppers, also horizontal. With the progressive compression toward the bottom of each column 5 preferably such that the density of the bagasse at the bottom is from two to three times that at the top, the pressure at the bottom is far too low to interfere with the flow of liquid through the bagasse, while the decrease in volume exposes the bagasse to more liquid for a given rate of flow and the density of the bagasse and the velocity of the liquid flowing through it, together, have the very beneficial effect of preventing channeling. Another advantage derivable from conducting the soaking and rinsing in the preferred hoppers, is that by valving of each of the liquid outlets 13, 14, 15, 18, 19, 22 and 23, as by suitable regulator valves 42, the volume of the liquid at any time in each column can readily be controlled and, below the top of the column, that volume can be greater, without causing objectionable flooding, because of the downward pressure of the overlying bagasse and liquid.

Figure 2:
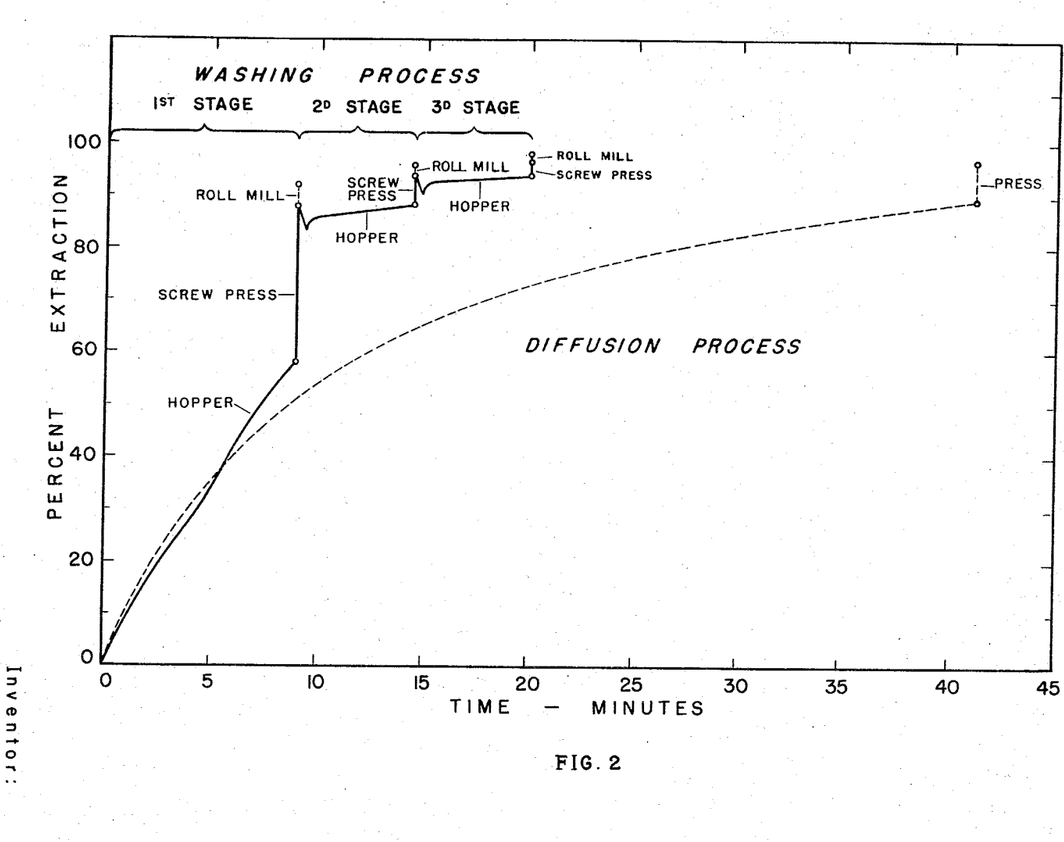
FIGURE 2 is a graph comparing the extraction of the preferred process with that of the diffusion process.

Although a number of the effects availed of in the preferred process are time dependent, the most critical of these is diffusion and, for the very high extraction of which the process is capable, the total retention time of the bagasse in the plurality of hoppers must be sufficient for diffusion to take place. To this end, the total time for the process will usually be from twenty to thirty minutes, with the bagasse spending the bulk of that time in the hoppers. Since the bagasse in the first hopper 1 has not previously been treated, except for the initial disintegration, and the effect of the treatment in that hopper will be felt further along the line, it usually will be preferable to allot a larger part of the total retention time to that hopper than to the others and this is readily obtained by making the first hopper higher. A typical division of the time for soaking and rinsing among the several hoppers in a twenty-minute extraction process is shown by the solid line curve in the graph of FIGURE 2 in which the time to any given point in the process is plotted against the percent of the initial juice extracted at that point. As shown by that curve, the bagasse is retained over eight minutes in the first hopper 2, with the balance of the total retention time divided equally between the second and third hoppers. While, as the curve indicates, 98% of the initial juice has been extracted from the exhausted bagasse discharged by the mill 30 at the end of the line, an extraction on the order of that obtainable by milling is obtained with only one stage of soaking-rinsing and excess liquid removal and with two stages, the extraction will almost equal the best results now obtainable by the diffusion process, a typical curve for which is shown in dotted line in the same figure for purposes of comparison.

As an example of an application of the process, a processing line, such as that illustrated in FIGURE 1, having a capacity for processing one hundred tons of sugar cane per hour, will receive the disintegrated bagasse in the first hopper 2 at substantially its initial composition, by weight usually about 12 parts fiber and 88 parts juice. During the time in which it is retained in the first hopper, the bagasse is subjected to hot diluent liquid, conveniently divided equally among its three stages, the quantity of which may be as much as fifteen hundred tons and, in this example, is some three hundred tons per hour. As it is positively withdrawn from the bottom of the hopper by the screw press 25, the bagasse contains an excess of the liquid and this is removed during the extrusion to the point at which the bagasse passed to the teasing and scrubbing machine 29 contains about 12 parts fiber and 28 parts juice. Some four tons per hour of superheated water are added in the adjoining teasing and scrubbing machine 29 and with this addition the bagasse is introduced into the second hopper 3.

With the retention time less and only two stages of rinsing, the bagasse in the second hopper is subjected only to some two hundred tons of hot diluent liquid per hour, but still has excess liquid when it is withdrawn by the related screw press 25 and has that excess removed by the press to reduce it to the same content of 12 parts fiber and 28 parts juice extruded by the press of the first stage, but, of course, with the juice more dilute. In the succeeding teasing and scrubbing machine 29 another four tons per hour of superheated water are added and with this addition the bagasse in the third hopper 4 is subjected to another two hundred tons of hot diluent liquid per hour of which some sixteen tone are water. Conveniently, the water is added through a separate feed line to the lower injector 21 with very dilute juice drawn from the reservoir 31 through the rearmost tap 38. After leaving the third hopper 4 the bagasse preferably has its excess liquid removed by the related screw press 25 to reduce its liquid content to about 12 parts fiber and 28 parts very dilute juice before being passed to the mill 30 at the end of the line but, though more difficult to handle, can be passed thereto without intervening pressing. In the mill the bagasse has further juice expressed to the point where the content of the exhausted bagasse discharged by the mill contains about 12 parts fiber and 12 parts juice, on the order of that discharged from the mill train in milling.

With eighty-eight tons per hour of juice fed into the line with the bagasse and twenty-four tons per hour of water introduced into the line and only twelve tons per hour of very dilute juice discharged with the exhausted bagasse, there is obtained from the extraction some one hundred tons per hour of rich juice containing some 98% of the juice from the bagasse fed into the line, with the richness of the extracted juice in sucrose thus more than 86% of that of the initial juice. Rid of solids by being filtered through a deep bed of freshly disintegrated cane in the upper part of the bagasse column 5 in the first hopper 2 immediately before being discharged into the front end portion of the reservoir 31, the extracted rich juice is withdrawn therefrom for further processing for its sucrose.

Figure 3:
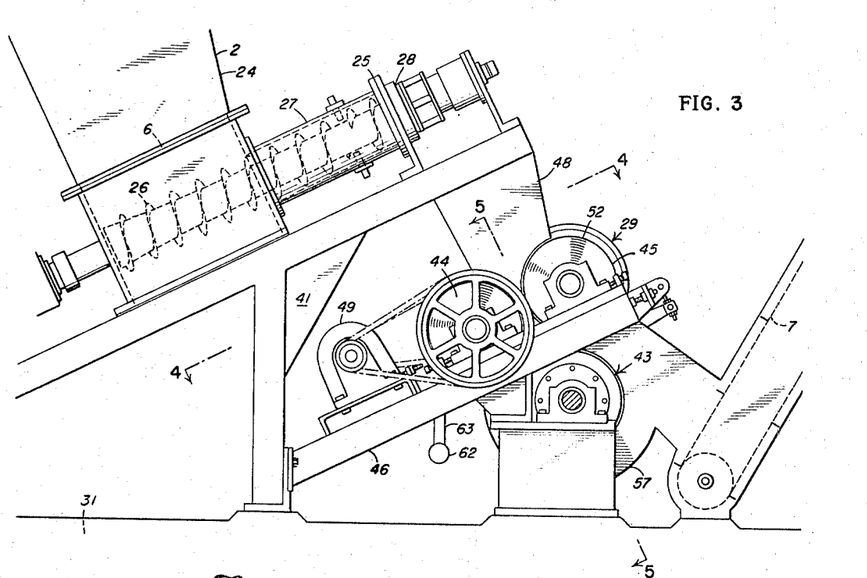
FIGURE 3 is an enlarged side elevational view of a teasing and scrubbing machine and adjoining structure in the line of FIGURE 1.
Figure 4:
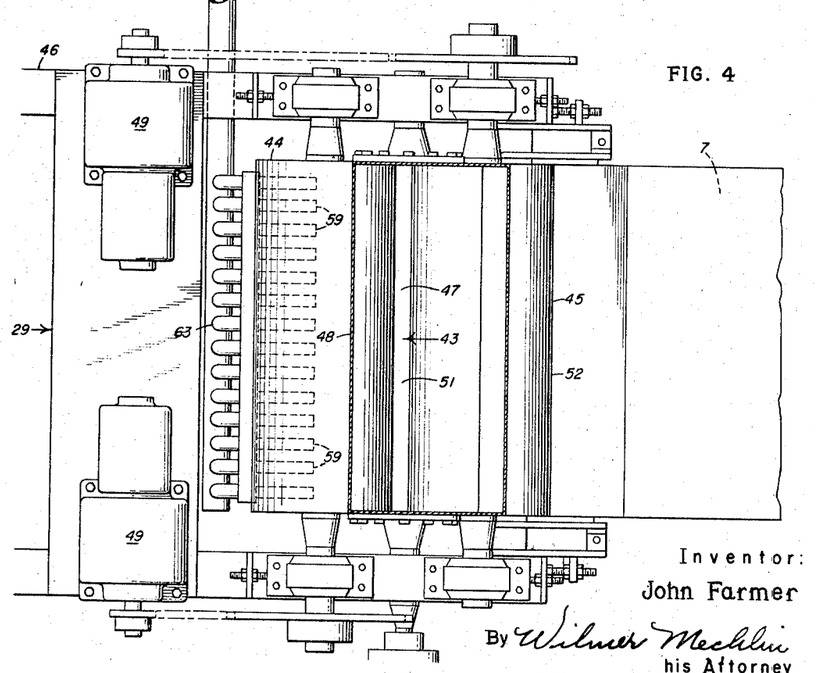
FIGURE 4 is a fragmentary horizontal sectional view taken along lines 4—4 of FIGURE 3.

Turning now to the improved teasing and scrubbing machines 29 interposed in the procesing line following the screw presses 25 of the first and second hoppers 2 and 3, each machine is comprised of a teasing rotor 43 and at least one and preferably a pair of counter-rotating inner and outer feed rolls 44 and 45, all mounted with axes parallel on a frame 46. Preferably laterally or radially adjustable for variation in their spacing and relatively small to enable the rotor 43 to work as close as possible to their nip 47, the feed rolls 44 and 45 are here positioned above the rotor 43 and receive the bagasse extruded from the screw press 25 of the related hopper 1 or 2 through a chute 48.

Driven at high speed, suitably by one of the drive motors 49 used to drive it and the feed rolls 44 and 45, and necessarily rotating counter to one of the feed rolls, here the outer roll 45, the rotor 43 preferably has its axis shifted slightly off line from the nip 47 toward the outer roll. Fixedly or swingably mounted about the periphery of the rotor 43 are a plurality of blades, teeth or tines 50 which preferably are arranged in straight rows, extending longitudinally of the rotors, with the blades in each row equally spaced and staggered relative to those in adjoining rows. Projecting radially or otherwise outwardly from the surface 51 of the rotor 43, the blades 50 preferably closely approach the surface 52 of the outer roll 45. If, as in the illustrated machine, the blades 50 are fixed and radial, those of each row may seat in an outwardly opening radial slot 53 interrupting the rotor's surface and be locked therein by a tie bolt 54 extending therethrough and through intervening spacers 55. To enable the spacers 55 to assist the tie bolt 54 in holding the blades 50 of each row in their seats, the preferred spacers are wedge-shaped, with an outward taper and a base wider than the blade-receiving slot 53, and seat in a correspondingly wedge-shaped seat 56 extending longitudinally through the rotor 43 intermediate the radial limits of the slot.

Figure 5:
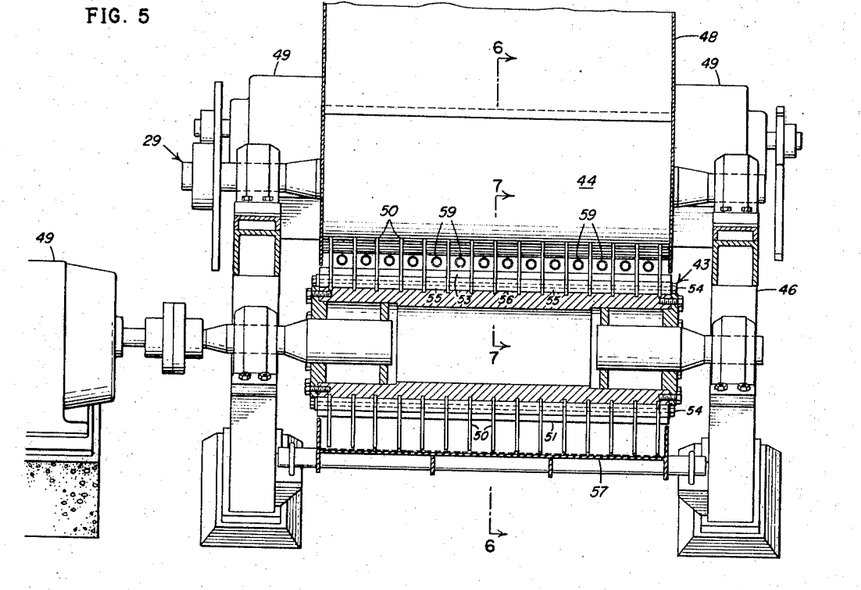
FIGURE 5 is a fragmentary vertical sectional view taken along lines 5—5 of FIGURE 3.
Figure 6:
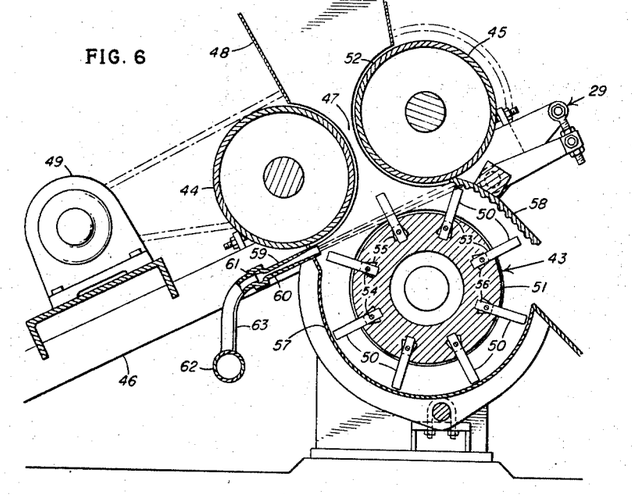
FIGURE 6 is a fragmentary vertical sectional view taken along lines 6—6 of FIGURE 5.
Figure 7:
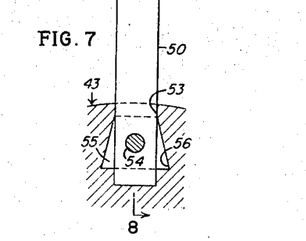
FIGURE 7 is a fragmentary sectional view on a further enlarged scale taken along lines 7—7 of FIGURE 5.
Figure 8:
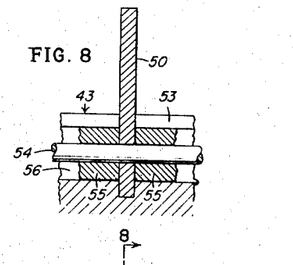
FIGURE 8 is a sectional view taken along lines 8—8 of FIGURE 7.

Disposed to receive the bagasse fed to it as a compressed blanket from the nip 47 of the feed rolls 44 and 45 and acting on that blanket against both rolls, and particularly the outer, counter-rotating roll, the rotor cuts across the blanket and tears apart the fibers held together by the pith cells, in the process rupturing previously unruptured cells. Contained on its under side in a casing or housing 57, the rotor 43 confronts on its opposite or discharge side a ribbed, corrugated or otherwise roughened, preferably concavely curved, scrubbing board or plate 58 which preferably is adjustable radially relative to the rotor and at its leading edge is substantially in engagement or contact with the surface 52 of the outer roll 45. Of substantially the width of the rotor 43, the scrubbing board 58 has passed over it at high speed, from between the rotor and the outer roll 45, a thin stream of fiberized bagasse which is scrubbed against the board, both by impinging upon and being deflected by the curvature of the board from its otherwise tangential path into which the trailing end of the board projects, and by the rotor blades 50. The fine teasing and combing action of the blades 50, in conjunction with the scrubbing action of the scrubbing board 58, not only tears fibers apart by separating them from connecting pith, but ruptures or breaks open cells left intact by any previous disintegration and without pounding out the impurities held by the lignified cells of the fibro-vascular bundles and rind material. Control over the type and amount of disintegration derived from the scrubbing action of the board 58, is readily exercisable not only by adjustment of its position but also by preselection of the texture of the roughened surface it presents to the bagasse. Too, the discharge of bagasse from the machine as a stream of considerable velocity that is readily controlled in its direction, enables the machine to feed directly into the adjoining dicharge conveyor, without need for an intervening conductor or conveyor.

In the preferred machine, the action of the rotor blades 50 and scrubbing board 58 is augmented by a water jet system by which water under high velocity is projected or impinged upon the thin stream of fibrous bagasse passing over the scrubbing board. In this system, a series of laterally spaced nozzles 59 is mounted in a row below the inner feed roll 44 and directed through the intervening blades 50 of the rotor 43 toward the scrubbing board 58, adjacent the latter's leading edge. Each of the nozzles 59 has in its inner end a restricted orifice 60 opening onto a relatively long throat 61 which expands toward its outer end. Superheated water, if released directly to atmosphere, will drop to its boiling point and in part be converted into steam, but, when released through a long expanding nozzle, will use most of the energy derived from the superheat to impart velocity to it and will leave the nozzle as a high speed jet. Thus, by supplying to each of the nozzles 59, as through a common supply pipe 62 and individual feeders 63, water superheated to a temperature of say 322° F. and under correspondingly high pressure, each pound will have about 110 B.t.u. to convert into velocity and, allowing for a loss in the nozzles of about 15%, a total of four tons per hour of water applied through the nozzles will provide about 300 H.P. of kinetic energy for scrubbing the fiberized bagasse against the scrubbing board 58. This action is particularly effective, when, as in the preferred machine, the distance from the nozzles to the scrubbing board is only about one foot. With the action of the jets added to that of the rotor blades 50, the preferred machine therefore is most effective in tearing fibers apart and rupturing previously intact cells.

From the above detailed description, it will be apparent that there has been provided an improved process and machine for use therein for extracting juice from cellular material, the process, as applied to sugar cane, being capable of extracting some 98% of the juice and the machine, when so used, being most effective as an intermediate disintegrator for rupturing previously intact cells and releasing juice tightly held in the fibers. It should be understood that the described and disclosed embodiments of the process and the machine are merely exemplary of the invention and that all modifications are intended to be included that do not depart from the spirit of the invention and the scope of the appended claims.

Having described my invention, I claim:

1. A process for extracting juice from cellular material, comprising disintegrating the material, and thereafter processing the disintegrated material in a plurality of stages in each of which it is cross-rinsed by passing diluent liquid thereacross for separating juice therefrom, and then has excess liquid removed, and in at least one of which it is soaked in diluent liquid prior to cross-rinsing for releasing juice therefrom.

2. A process for extracting juice from cellular material, comprising disintegrating said material, cross-rinsing said disintegrated material by passing diluent liquid thereacross in each of a plurality of stages to separate juice therefrom, soaking said distintegrated material in diluent liquid in at to cross-rinsing in at least one stage for releasing juice therefrom, and removing excess liquid from the rinsed material in advance of each succeeding stage.

3. A process for extracting juice from cellular material, comprising disintegrating said material, cross-rinsing said disintegrated material by passing diluent liquid thereacross in each of a plurality of stages to separate juice therefrom, soaking said disintegrated material in diluent liquid in at least one stage prior to cross-rinsing for releasing juice therefrom, and pressing said material after cross-rinsing in each stage to separate additional juice therefrom.

4. A process for extracting juice from cellular material, comprising disintegrating the material, and thereafter processing the disintegrated material in a plurality of stages in each of which it is first soaked in and then cross-rinsed with hot diluent liquid and thereafter has the excess liquid removed.

5. A process for extracting juice from cellular material, comprising disintegrating the material, and thereafter processing the disintegrated material in a plurality of stages in each of which it is first soaked in and then pressure cross-rinsed with diluent liquid and thereafter has the excess liquid removed.

6. A process for extracting juice from cellular material, comprising disintegrating the material, and thereafter processing the disintegrated material in a plurality of stages in each of which it is first soaked in and then pressure cross-rinsed with diluent liquid and thereafter has the excess liquid removed by pressure.

7. A process for extracting juice from cellular material, comprising disintegrating the material and thereafter processing the disintegrated material in a plurality of stages in each of which it is first soaked in and then cross-rinsed with diluent liquid and thereafter has the excess liquid removed by gravity draining.

8. A process for extracting juice from cellular material, comprising partly disintegrating the material, processing the partly disintegrated material in a plurality of stages, in each of which it is first soaked in and then cross-rinsed with diluent liquid and thereafter has the excess liquid removed, and further disintegrating the material between certain of said stages.

9. A process for extracting juice from cellular material, comprising partly disintegrating the material, thereafter processing the partly disintegrated material in a plurality of stages in each of which it is first soaked and then pressure cross-rinsed with hot diluent liquid and thereafter has the excess liquid removed, and further disintegrating the material after the first and in advance of each succeeding stage.

10. A process for extracting juice from cellular material, comprising disintegrating the material and thereafter processing the disintegrated material in a plurality of stages in each of which it is fed into a downwardly directed container and moves downwardly therethrough by gravity as a column while being first soaked and then cross-rinsed with diluent liquid injected at a plurality of levels into said column and thereafter has the excess liquid removed.

11. A process for extracting juice from cellular material, comprising disintegrating the material and thereafter processing the disintegrated material in a plurality of stages in each of which it is fed into a downwardly directed container and moves downwardly therethrough by gravity as a column while being first soaked and then cross-rinsed with diluent liquid injected respectively into a top and a side of said column and thereafter has the excess liquid removed.

12. A process for extracting juice from cellular material, comprising disintegrating the material and thereafter processing the material in a plurality of stages in each of which it is fed into, moves downwardly through and is positively withdrawn from a bottom of a downwardly directed container at rates to maintain in said container a material column of substantially uniform height, while in said column first is soaked and then cross-rinsed with diluent liquid injected respectively into a top and side thereof, and after withdrawal has the excess liquid removed.

13. In a process for extracting juice from cellular material, the steps comprising disintegrating said material, soaking said disintegrated material in diluent liquid for releasing juice therefrom, moving said soaked material as a column, passing diluent liquid across said column for cross-rinsing the material therein and separating juice therefrom, and pressing said rinsed material to remove excess liquid therefrom.

14. In a process for extracting juice from cellular material, the steps comprising disintegrating said material, feeding said disintegrated material into a downwardly directed container, soaking said disintegrated material by injecting diluent liquid into a top of said container for releasing juice therefrom, moving said soaked material downwardly by gravity as a column through said container, passing diluent liquid across said column for cross-rinsing said soaked material and separating juice therefrom, and subjecting the rinsed material from said container to pressure for separating additional juice therefrom.

15. In a process for extracting juice from sugar cane, the steps comprising disintegrating said cane into bagasse, soaking said bagasse in diluent liquid for releasing juice therefrom, moving said soaked bagasse downwardly by gravity as a column through a downwardly directed container, cross-rinsing said soaked bagasse with diluent liquid passed across said column for separating juice therefrom, and removing excess liquid from said rinsed bagasse.

16. In a process for extracting juice from sugar cane, the steps comprising disintegrating said cane into bagasse, soaking said bagasse in diluent liquid for releasing juice therefrom, moving said soaked bagasse downwardly by gravity as a column through a downwardly directed container, cross-rinsing said soaked bagasse with diluent liquid injected under pressure into a side of and passed across said column for separating juice therefrom, and pressing said rinsed bagasse to remove excess liquid therefrom.

17. In a process for extracting juice from sugar cane, the steps comprising disintegrating said cane into bagasse, feeding said bagasse into a downwardly directed container, moving said bagasse downwardly by gravity as a column through said container soaking said bagasse with hot diluent liquid injected into a top of said column for releasing juice therefrom, cross-rinsing said soaked bagasse with hot diluent liquid injected under pressure into a side of and passed across said column for separating juice therefrom, and pressing said rinsed liquid to remove excess liquid therefrom.

18. In a process for extracting juice from cellular material, the steps comprising disintegrating said material, soaking said disintegrated material in diluent liquid for releasing juice therefrom, moving said soaked material downwardly by gravity as a colmun through said container, injecting into a side of and passing across said column diluent liquid for cross-rinsing the soaked material therein and separating juice therefrom, positively withdrawing said bagasse from a bottom of said column at a rate to maintain the height thereof substantially constant, and pressing said withdrawn material to remove excess liquid therefrom.

19. In a process for extracting juice from cellular material, the steps comprising disintegrating said material, soaking said disintegrated material in diluent liquid to release juice therefrom, moving said soaked material downwardly by gravity as a column through and downwardly directed container, injecting into a side of and passing across said column liquid diluent for cross-rinsing the soaked material therein, and separating juice therefrom, positively withdrawing said rinsed material from a bottom of said column at a rate to maintain the height thereof substantially constant, and pressing said withdrawn material to remove excess liquid therefrom.

20. In a process for extracting juice from sugar cane, the steps comprising disintegrating said can into bagasse, feeding said bagasse into a downwardly directed container, injecting diluent liquid into a top of said column for soaking said bagasse and releasing juice therefrom, moving said soaked bagasse downwardly by gravity as a column through said container, injecting into a side of and passing across said column diluent liquid for cross-rinsing the soaked bagasse therein, and separating juice therefrom, positively withdrawing said rinsed bagasse from a bottom of said column at a rate to maintain the height thereof substantially constant, and gravity draining excess liquid from said withdrawn bagasse.

21. In a process for extracting juice from fibrous cellular material, the steps comprising disintegrating said material, soaking said disintegrated material in diluent liquid to release juice therefrom, moving said soaked material downwardly by gravity as a column through a downwardly directed container, injecting into a side of and passing across said column diluent liquid for cross-rinsing said soaked material therein, and separating juice therefrom, positively withdrawing said rinsed material from a bottom of said column, removing excess liquid from said withdrawn material, and teasing and scrubbing said material to rupture unruptured cells in said bagasse and release juice tightly held thereto.

22. A teasing and scrubbing machine for use in a process for extracting juice from cellular material, comprising roll means, a rotor positioned to receive material therebetween and said roll means, roughened board means positioned in the path of material passed between said rotor and roll means, and a plurality of blades projecting outwardly from said rotor and cooperating with said roll and board means to tease and scrub said material for rupturing juice-containing cells therein and releasing juice tightly held thereby.

23. A teasing and scrubbing machine for use in a process for extracting juice from cellular material, comprising a rotor having a plurality of radially projecting fixed blades, a pair of feed rolls for feeding material to and between one thereof and said rotor, and a ribbed board positioned to receive and deflect material passed between said rotor and one roll, said one roll, rotor and board cooperating to tease and scrub said material for rupturing previously unruptured juice-containing cells therein and releasing juice tightly held thereby.

24. A teasing and scrubbing machine for use in a process for extracting juice from cellular material, comprising a rotor having a plurality of radially projecting fixed blades, a pair of feed rolls for feeding material to and between one thereof and said rotor, a ribbed board positioned along the path of material passed between said rotor and one roll, and jet means directed across said path toward said board means, said one roll, rotor, board and jet means cooperating to tease and scrub said material for rupturing previously unruptured juice-containing cells therein and releasing juice tightly held thereby.

25. A teasing and scrubbing machine for use in a process for extracting juice from cellular material, comprising a rotor having a plurality of radially projecting fixed blades, a pair of feed rolls for feeding material to and between one thereof and said rotor, a concavely curved ribbed board positioned along and projecting into the path of material passed between said rotor and one roll, and a plurality of laterally spaced nozzles positioned to direct jets toward said board means through intervening of said rotor blades and across said path, said one-roll rotor, rotor, board and jets cooperating to tease and scrub said material for rupturing previously unruptured juice-containing cells therein and releasing juice tightly held thereby.

26. A teasing and scrubbing machine for use in a process for extracting juice from cellular material, comprising a rotor having a plurality of radially projecting fixed blades, a pair of feed rolls for feeding material to and between one thereof and said rotor, a concavely curved ribbed board positioned along and projecting into the path of material passed between said rotor and one roll, and a plurality of laterally spaced nozzles each having a restricted orifice and an expanding throat for receiving and converting superheated water into a high speed jet, said nozzles being disposed to direct said jets through intervening of said rotor blades and across said path toward said board.

27. A teasing and scrubbing machine for use in a process for extracting juice from cellular material, comprising roll means, a rotor positioned to receive material therebetween and said roll means, roughened board means positioned in the path of material passed between said rotor and roll means, a plurality of fixed blades projecting radially from said rotor, and wedge means for locking said blades to said rotor, said blades cooperating with said roll and board means to tease and scrub said material for rupturing juice-containing cells therein and releasing juice tightly held thereby.

References Cited

UNITED STATES PATENTS

| | | | |
|---|---|---|---|
| 674,483 | 5/1901 | Steffen | 127—43 |
| 710,533 | 10/1902 | Steffen | 127—8 X |
| 1,006,311 | 10/1911 | Steffen | 127—6 |
| 923,760 | 6/1909 | Bock | 127—7 |
| 1,832,472 | 11/1931 | Olier | 127—7 |
| 2,340,009 | 1/1944 | Meakin | 100—43 |
| 2,560,147 | 7/1951 | Anderson | 100—147 X |
| 3,203,833 | 8/1965 | Stewart et al. | 127—45 |

FOREIGN PATENTS

| | | |
|---|---|---|
| 9,121 | 6/1908 | France. |
| 417,890 | 9/1910 | France. |

MORRIS O. WOLK, *Primary Examiner.*

D. G. CONLIN, *Assistant Examiner.*

U.S. Cl. X.R.

23—267; 100—147; 127—3, 5, 6, 45

UNITED STATES PATENT OFFICE
CERTIFICATE OF CORRECTION

Patent No. 3,425,869                                  February 4, 1969

John Farmer

It is certified that error appears in the above identified patent and that said Letters Patent are hereby corrected as shown below:

Column 11, line 61, cancel "in at" and insert -- prior --.

Signed and sealed this 21st day of April 1970.

(SEAL)
Attest:

Edward M. Fletcher, Jr.                            WILLIAM E. SCHUYLER, JR.
Attesting Officer                                          Commissioner of Patents